United States Patent [19]

Lin et al.

[11] Patent Number: 4,990,575
[45] Date of Patent: Feb. 5, 1991

[54] NOVEL OLEFIN-TERMINATED UREAS FROM POLYOXYALKYLENE AMINES AND ISOCYANATES

[75] Inventors: Jiang-Jen Lin, Houston; George P. Speranza, Austin, both of Tex.

[73] Assignee: Texaco Chemical Co., White Plains, N.Y.

[21] Appl. No.: 410,162

[22] Filed: Sep. 20, 1989

[51] Int. Cl.$^5$ ............................................. C08G 18/83
[52] U.S. Cl. .................................... 525/403; 525/526; 528/69; 528/68; 564/56
[58] Field of Search .................. 525/403, 526; 528/69, 528/68; 564/56

[56] References Cited

U.S. PATENT DOCUMENTS 3,896,014  7/1975  Rosenberg ............................. 528/69

Primary Examiner—Maurice J. Welsh
Attorney, Agent, or Firm—Jack H. Park; Kenneth R. Priem; Cynthia L. Kendrick

[57] ABSTRACT

Disclosed are novel compositions derived from polyoxyalkylene amines comprising olefin-terminated polyoxyalkylene ureas prepared by reacting polyoxyalkylene amines of the formula:

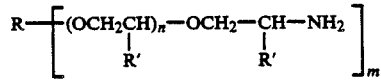

with isopropenyl dimethylbenzyl isocyanate represented by the formula:

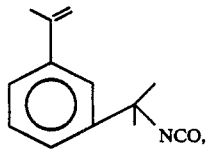

said composition being represented by the formulas:

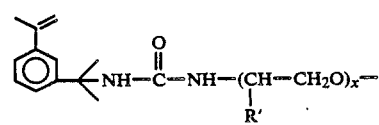

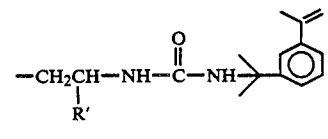

and

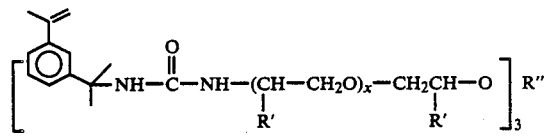

where R'=H or methyl or ethyl and R" is the nucleus of a trifunctional polyol such as glycerine, trimethylolpropane, etc. and x has a value of 2 to 70.

9 Claims, No Drawings

NOVEL OLEFIN-TERMINATED UREAS FROM POLYOXYALKYLENE AMINES AND ISOCYANATES

BACKGROUND OF THE INVENTION

1. Technical Field of the Invention

This invention relates to the modification of elastomers with dienes and more particularly to polyoxyalkylene amines and the reaction thereof with an isocyanate to form new compositions generally useful in cross-linking vinyl monomers. The composition exhibits advantages over similar products prepared from polyols and isopropenyl dimethylbenzyl isocyanate.

A wide range of polyoxyalkylene amines may be employed. JEFFAMINE® EDR-series amines, for example, are reacted with isopropenyl dimethylbenzyl isocyanate to form solid olefin-terminated polyoxyalkylene amine ureas. In another embodiment polyoxyalkylene diamines, such as JEFFAMINE® D-series and EDR-series amines are reacted with isopropenyl dimethylbenzyl isocyanate to form olefin-terminated polyoxyalkylene diamine ureas which are generally solids except for the case where the high molecular weight JEFFAMINE® D-2000 amine is the reactant.

2. Related Art

It is known in the art to use some dienes to modify the properties of elastomers via heat, ultraviolet, peroxide and Ziegler type catalyst curings or polymerization. For example, the ethylene propylene diene elastomer is a polymer made by such a technique.

Work in the field of copolymerization of this type is described in an article titled "Synthesis of EPDM Elastomer By Fluid Bed Processing" PERP Quarterly Report, Vol. 4, 1985. This article contains a very good overview of the history of ethylene propylene rubbers and provides an analysis of one method to produce low density, low modulus ethylene copolymers in a fluidized bed using a diene. It is noted that in that fluid bed process the use of a catalyst is necessary, such as an organo-metallic of the Ziegler type catalyst.

In U.S. Pat. No. 4,618,652 there is disclosed a method of thermally curing a bismaleimide resin into a solid polymer by admixing a small amount of 5-vinyl-2-stilbazole as the copolymeric unit. It is stated that the properties of bismaleimide resins and their preparation conditions are substantially improved by this method. No catalysts were used in the preparation of the copolymers.

In an article titled "1,5-Hexadiene and 1,9-Decadiene: New Specialty Chemicals", Chemical Systems PERP Quarterly Report, Vol. 3, 1985, there is described another application of the metathesis reaction, the interaction of cyclic olefins with ethylene to provide alpha, omega-dienes. Here, 1,5-hexadiene is obtained by the reaction of ethylene with the butadiene dimer, 1,5-cyclooctadiene, and 1,9-decadiene results from the reaction of ethylene and cyclooctene. These materials are regarded as specialty multifunctional olefins for use in cross-linking ethylene and propylene elastomers.

In the art discussed above there does not appear to be anything which would suggest the production of olefin-terminated ureas from polyoxyalkylene amines.

It would be desirable if novel high molecular weight diolefin compounds for copolymerization could be prepared. It would be very desirable if these novel olefin compounds could be used in a number of olefin polymerizations or to modify properties of elastomers without the addition of organometallic or tertiary amine catalysts via heat or free radical initiators. Further, it would be advantageous if the compositions resulting from use of these compounds in copolymerization exhibited desirable properties.

SUMMARY OF THE INVENTION

This invention provides novel compositions useful in cross-linking vinyl monomers such as those derived from olefins, acrylonitrile, styrene, butadiene, acrylates, methacrylates, maleimides and mixtures thereof.

The compositions are novel amine derivatives comprising olefin-terminated polyoxyalkylene ureas formed by the reaction of amines with a certain isocyanate.

Solid and liquid compositions, some of which are water-soluble are formed by reacting polyoxyalkylene diamines, such as JEFFAMINE® D-series and ED-series, with isopropenyl dimethylbenzyl isocyanate.

One type of composition is formed by reacting polyethylene glycol diamines, such as the JEFFAMINE® EDR-series amines with isopropenyl dimethylbenzyl isocyanate to form solid olefin-terminated JEFFAMINE® amine ureas.

In other examples the amine reactants are JEFFAMINE® D-series diamines which are based on a propylene glycol backbone.

A typical reaction using the triethylene glycol diamine can be represented as follows:

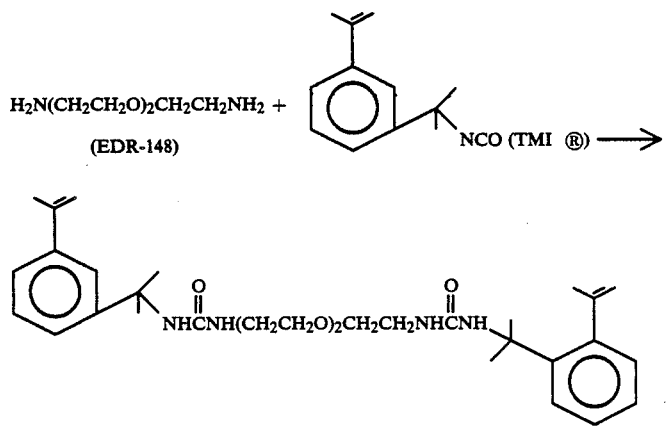

DETAILED DESCRIPTION

This invention discloses a novel reaction of JEFFAMINE ® amines and a specific isocyanate and is a method for preparing novel amine derivatives. In the narrower and more preferred practice of this invention olefin-terminated JEFFAMINE ® amines are prepared by reacting polyoxyalkylene amines with isopropenyl dimethylbenzyl isocyanate.

THE POLYOXYALKYLENE POLYAMINE COMPONENT

The polyoxyalkylene polyamine starting materials for the present invention include polyoxyalkylene diamines. The amine reactants may also contain both ethylene oxide and propylene oxide and, preferably, mixtures of from about 5 to about 95 wt % of ethylene oxide with, correspondingly, from about 95 to 5 wt % of propylene oxide. Where mixed propylene oxide/ethylene oxide polyols are employed, the ethylene oxide and propylene oxide may be premixed prior to reaction to form a heterocopolymer, or the ethylene oxide and the propylene oxide may be sequentially added to the ethoxylation kettle to form blocked oxypropylene/oxyethylene copolymers.

In general, the polyoxyalkylene polyamine starting material may be defined as a polyoxyalkylene polyamine having the formula:

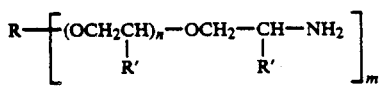
(IV)

wherein R is the nucleus of an oxyalkylation-susceptible polyhydric alcohol containing 2 to 12 carbon atoms and 2 or 3 hydroxyl groups, R' is hydrogen or methyl, n is a number having an average value of 0 to 100, and m is an integer having a value of 2 to 3.

The polyoxyalkylene polyamine can be a polyoxypropylene triamine.

In general, the average molecular weight of the polyoxypropylene triamine starting material will be from about 400 to about 5000. Examples of appropriate polyoxypropylene triamines that may be used as a starting material for the present invention include triamines sold by Texaco Chemical Company as JEFFAMINE ® T-series products having the formula:

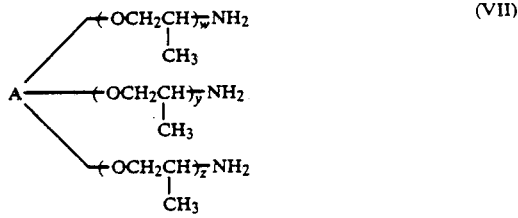
(VII)

wherein A represents the nucleus of an oxyalkylation susceptible trihydric alcohol containing about 3 to about 6 carbon atoms, w, y and z are numbers and the average value of the sum of w+y+z is from about 6 to about 100.

An example of such a product is a commercial product having an average molecular weight of about 400 wherein A represents a trimethylol propane nucleus, and the product contains about 5 to about 6 moles of propylene oxide (JEFFAMINE ® T-403 amine). Another is a product having an average molecular weight of about 5000 wherein A represents a glycerol nucleus and the product contains about 85 moles of propylene C oxide (JEFFAMINE ® T-5000).

Generally, the group of appropriate polyoxyalkylene diamines that may be used are those that are sold by the Texaco Chemical Company as JEFFAMINE ® D-series products having the formula:

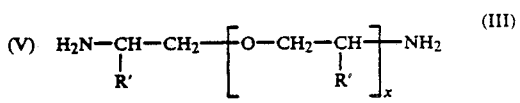

wherein R' independently represents methyl and x is a number having an average value of about 2 to about 70.

Representative products having this structural formula include polyoxypropylene diamines (wherein R' is methyl) having an average molecular weight of about 230 wherein the value of x is between 2 and 3 (JEFFAMINE ® D-230 amine), polyoxypropylene diamines having an average molecular weight of about 400 wherein x has a value between about 5 and 6 (JEFFAMINE ® D-400 amine), a polyoxypropylene diamine product having an average molecular weight of about 2000 wherein x has a value of about 33 (JEFFAMINE ® D-2000 amine), and a product having an average molecular weight of about 4000 wherein x has a value of about 60 (JEFFAMINE ® D-4000 amine).

Where the D-series amine D-2000 is combined with isopropenyl dimethylbenzyl isocyanate, the structure of the product can be represented by the following:

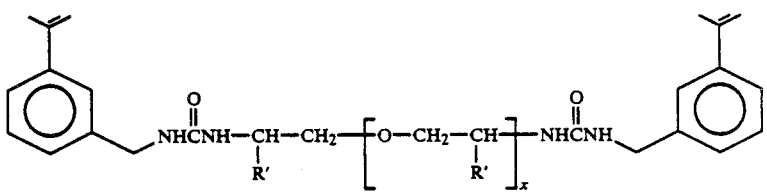

where x has a value of about 33. The olefin-terminated urea prepared from JEFFAMINE ® D-2000 is a liquid and is water insoluble. These products are useful cross-linking agents in the polymerization reactions of other olefinic material and as modifiers of polyolefin polymers.

Also suitable are amine terminated polyethylene glycols, such as those marketed by Texaco Chemical Co. under the tradename JEFFAMINE ® EDR-148 AND -192. The structure of the EDR series diamine can be represented by:

H₂N─(CH₂CH₂O)ₙ─CH₂CH₂NH₂ where n=2 or 3.

JEFFAMINE ® EDR-148 is an amine terminated triethylene glycol having the formula:

H₂N—CH₂CH₂—O—CH₂CH₂—O—CH₂C- H₂—NH₂   (IV)

JEFFAMINE ® EDR-192 is an amine terminated tetraethylene glycol having the formula:

H₂N—CH₂CH₂—O—CH₂CH₂—O—CH₂C- H₂—O—CH₂CH₂—NH₂   (V)

In the one embodiment a solid containing α-methyl styrene-like terminations of JEFFAMINE ® amine ureas can be prepared from JEFFAMINE ®EDR-148 diamine.

Where JEFFAMINE ® EDR-148 is combined with isopropenyl dimethylbenzyl isocyanate the structure can be represented by:

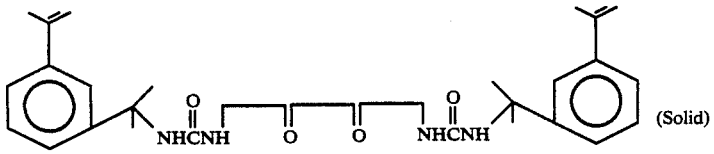
(Solid)

The novel products are obtained using a molar excess of isocyanate. An isopropanol solvent is preferred with the low molecular weight JEFFAMINE ® amines, such as EDR-148. The products resulting from this method are useful in cross-linking vinyl monomers as will be demonstrated.

In other examples, polyoxyalkylene diamines, such as JEFFAMINE ® ED-series amines are reacted with isopropenyl dimethylbenzyl isocyanate to form amine derived urea-olefins which are generally solid, but can be liquid and/or water-soluble, depending on the amine used.

This group is represented by water-soluble diamines based on a predominantly polyethylene glycol (PEG) backbone of the formula:

NH₂CH(CH₃)CH₂—[OCH(CH₃)CH₂]ₐ₋₁[OCH₂CH₂]ᵦ—[OCH₂CH(CH₃)]ₐNH₂ where a=a number having a value of from about 1 to about 5 and b is a number having a value of from about 1 to about 500.

Polyoxyethylene diamines having this formula include JEFFAMINE ® ED-600, ED-900 and ED-2000, having approximate molecular weights of 600, 900 and 2000, respectively.

Where JEFFAMINE ® ED-2000 is used, the product can be represented by the following structure:

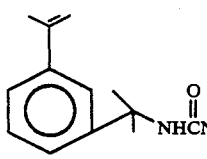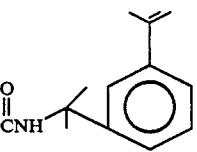
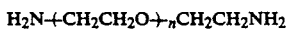NHCNHNCH(CH₃)CH₂—[OCH(CH₃)CH₂]ₐ₋₁—[OCH₂CH₂]ᵦ—[OCH₂CH(CH₃)]ₐNHCNH wherein a has a value of 1.3 and b is about 40. This urea-olefin is a liquid and exhibits solubility in water.

These products having styrene-like terminations of JEFFAMINE ® amine ureas are colorless liquids or solids with satisfactory analysis. These new olefin compounds can be used in most olefin polymerizations, especially in uses for elastomers via UV, heat or peroxide curing.

SOLVENT

The use of a solvent is not essential in most of the examples, where higher molecular weight polyoxyalkylene amines are the reactants. Where the molecular weight of the amine is less than 1000 a solvent is preferred. A suitable solvent is isopropanol.

The preferred amount of solvent in the reaction mixture is from 50 to 400% and preferably 20 to 80%. The isopropanol solvent is useful on the order of about 50 to 200% based on the weight of the total ingredients and aids in reducing the viscosity of the reaction mixture.

PREPARATION OF NOVEL OLEFIN-TERMINATED AMINES

The starting materials employed are polyoxyalkylene polyamines and isopropanol, where lower molecular weight polyoxyalkylene amines are used, and isopropenyl dimethylbenzyl isocyanate.

The new olefin-terminated amines are manufactured according to the invention by reacting a polyoxyalkylene amine with the isopropenyl dimethylbenzyl isocyanate in a ratio of at least 2 to 1 moles of the isocyanate group to amine. With regard to this invention, the resulting products and the properties exhibited by them do not have the same qualities when other isocyanates are employed. The preferred isocyanate can be obtained commercially as TMI ®. TMI ® is the tradename for isopropenyl dimethylbenzyl isocyanate produced by American Cyanamide.

The reaction is exothermic and requires cooling. A solid is generally precipitated after addition of low molecular weight JEFFAMINE ® amines. The solid product is obtained by filtration an drying.

PRODUCTS

The olefin-terminated urea composition manufactured according to the invention show a number of advantages.

The product of this invention can be used to cross-link vinyl monomers such as those derived from acrylonitrile, styrene, butadiene, acrylates, methacrylates, α-olefins, maleimides and mixtures thereof.

An advantage of the products of our invention over similar products prepared from polyols and TMI ® is that in many instances all of the ingredients can be mixed and polymerized and the molecular weights of the cross-linking agents can be varied over a wide range depending on the molecular weight of the polyether amines.

It is preferable to use free radical initiators in carrying out copolymerizations using the products of this invention. However, in the case of maleimides, the copolymerization can be carried out by simply heating the monomers to give cross-linked resins.

To illustrate the process of the invention the following Examples are given. It is to be understood, however, that the Examples are given only in the way of illustration and are not regarded as limiting the invention in any way.

EXAMPLE 1

JEFFAMINE ® EDR-148 And TMI ® (1:2 Molar Ratio) Adduct

A 250 ml 3-necked flask equipped with a thermometer, a Dean-Stark trap, a stirrer and nitrogen inlet line, was charged with TMI ® (50 g, 0.25M) and isopropanol (50 g). With vigorous stirring JEFFAMINE ® EDR-148 (18.5 g, 0.125M) was added portionwise. The reaction was exothermic and cooled by cool water and kept at <50° C. After the addition of JEFFAMINE ®EDR-148, a solid was precipitated which was washed with i-PrOH. A white solid powder was obtained by filtration. After washing and drying it weighed 55 g. The NMR analysis indicated a structure containing a JEFFAMINE ® EDR-148 - urea linkage with olefin terminations.

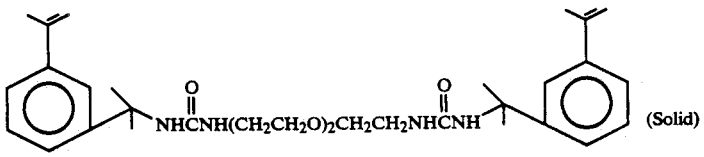

EXAMPLE 2

JEFFAMINE ® D-2000 And TMI ®

The experiment of Example 1 was repeated except using JEFFAMINE ® D-2000 and TMI ®at 1:2 molar ratio and no solvent. The resulting product was a colorless liquid material with analysis of total amine 0.02 meq/g, Pt/Co color 10 and viscosity 15,000 cs/25° C. The absence of amine indicated the presence or formation of the urea-linkage.

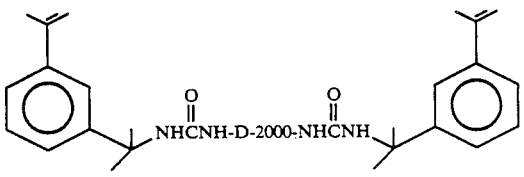

(liquid, water insoluble)

EXAMPLE 3

JEFFAMINE ® ED-2001 And TMI ®

The experimental procedures were repeated except using JEFFAMINE ® ED-2001 (100 g, 0.05M) and TMI ®(20.1 g, 0.1M) (i.e. isopropenyl dimethylbenzyl isocyanate, American Cyanamide). No solvent was used. The resulting product was a white solid with the following analyses: total amine 0.008 meq/g, melting point 35° C. It was water-soluble.

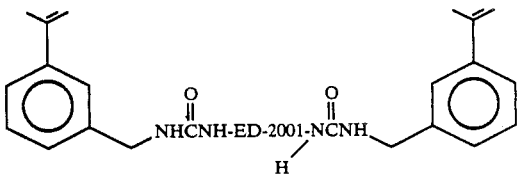

EXAMPLE 4

JEFFAMINE ® D-230 And TMI ®

To a 250-ml 3-necked flask equipped with a thermometer, a stirrer and N$_2$-line was charged TMI ®40 g, then JEFFAMINE ® D-230 (22.9 g) in i-PrOH (80 ml) was added. An exothermic temperature of 60° C. was recorded. After about one hour after all of the ingredients were allowed to react, the i-PrOH solvent was removed using a rotary evaporator. A viscous liquid, having a total amine content of 0.045 meq/g was obtained. (The liquid became a hard solid).

EXAMPLE 5

JEFFAMINE ® EDR-192 And TMI ®

A similar experiment as described in Example 1 was repeated except that JEFFAMINE ® EDR-192 (24 g, 0.125M) was charged with TMI ® (50 g, 0.25M) and i-PrOH (100 ml). The final product was a hard, white solid, having a structure similar that of the product obtained in Example 1.

EXAMPLE 6

Example 6 demonstrates how the products of the instant invention can be more easily used in a polymerization reaction without requiring the addition of any catalyst.

This example shows the simplicity of a procedure where a polyoxypropylenepolyamine is mixed with a bismaleimide, the isocyanate added and the mixture heated to give a resin. To three parts of JEFFAMINE ® T-3000 amine was added 0.4 parts of 1,1'-(methylene di-4,1-phenylene)bismaleimide and 0.4 parts of TMI ®. The mixture was agitated with nitrogen and heated to 200°. It was held at 200√ C. for 3 hours and then held at 220° C. for 1 hour. A solid resin was obtained.

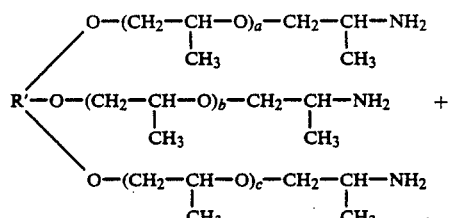

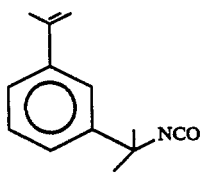

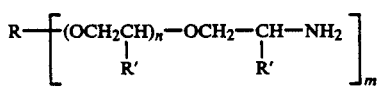

Similar results were obtained when JEFFAMINE ® T-5000 amine and JEFFAMINE ® D-2000 amine were used instead of T-3000.

What is claimed is:

1. A composition useful in cross-linking vinyl monomers comprising the reaction product of a polyoxyalkylene polyamine having the formula:

$$R-[(OCH_2CH)_n-OCH_2-CH-NH_2]_m$$
$$\phantom{R-[(OCH_2CH)_n-}R' \phantom{OCH_2-CH-}R'$$

wherein R is the nucleus of an oxyalkylation susceptible polyhydric alcohol containing 2 to 12 carbon atoms and 2 to 3 hydroxyl groups, R' is hydrogen or methyl, n is a number having an average value of 0 to 50 and m is an integer having a value of 2 to 3 and isopropenyl dimethylbenzyl isocyanate, having the formula:

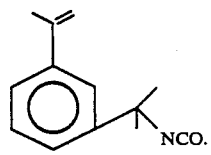

2. An olefin-terminated polyoxyalkylene amine urea useful in cross-linking vinyl monomers having the formula:

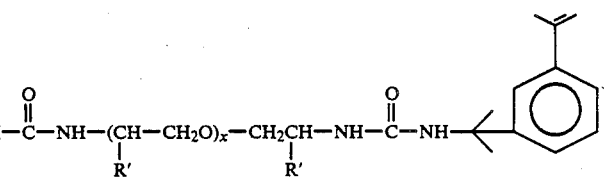

wherein R' is H, methyl or ethyl and x is a number having an average value of about 2 to 70.

3. The composition of claim 1 wherein the polyoxyalkylene amine has the formula:

$$H_2N-(CH_2CH_2O)_n-CH_2CH_2NH_2$$

where n=2 or 3.

4. The composition of claim 3 where n=2, the amine is triethylene glycol diamine and the composition is represented by the formula:

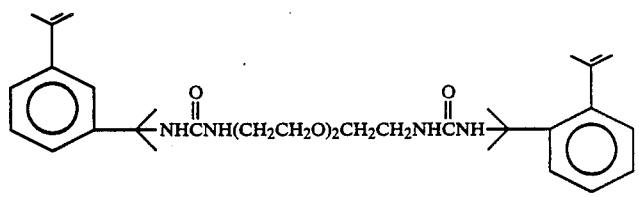

5. The composition of claim 1 wherein the poyoxyalkylene amine has the formula:

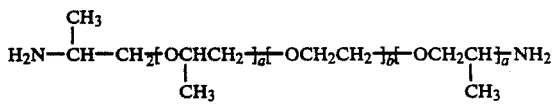

wherein a equals a number having a value of from about 1 to about 5 and b is a number having a value of from about 1 to about 500.

6. The composition of claim 5 wherein in the polyoxyalkylene amine has a value of about 1.3, and b has a value of about 40, the average molecular weight is about 2000 and the composition can be represented by the formula:

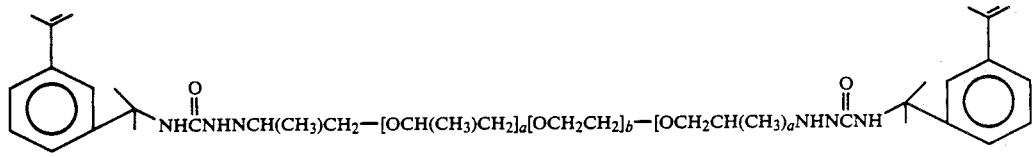

7. The composition of claim 1 wherein the polyoxyalkylene amine is represented by the formula:

NH$_2$CH(CH$_3$)CH$_2$—[OCH$_2$CH(CH$_3$)]$_x$—NH$_2$ where x is about 33.

8. The composition of claim 7 wherein x=about 33, the polyoxyalkylene amine has an approximate molecular weight of 2000 and the composition can be represented by the formula:

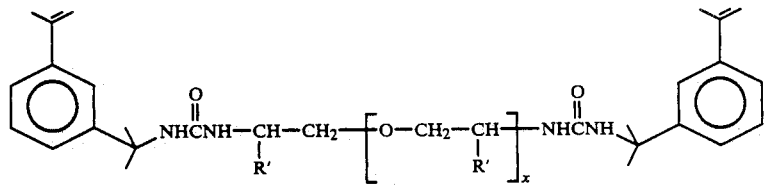

where x has a value of about 33.

9. The composition of claim 1 represented by the formula:

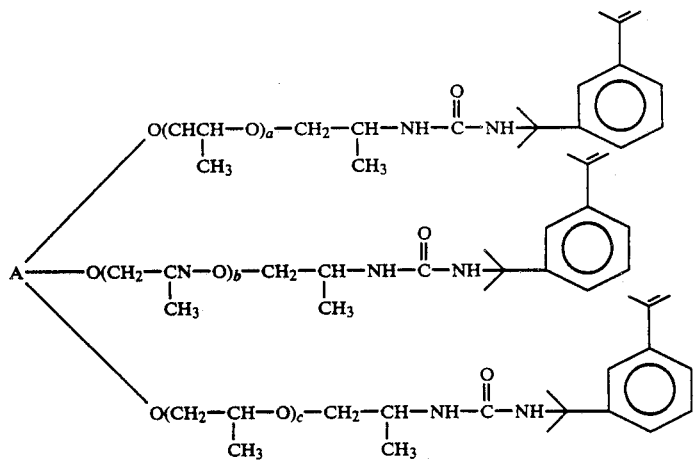

where
a+b+c=3 to 100, and
A represents the nucleus of an oxyalkylation susceptible trihydric alcohol having from 3 to 12 carbon atoms.

* * * * *